J. S. DUKE.
BIN MEASURING APPARATUS.
APPLICATION FILED DEC. 19, 1907.
919,139.
Patented Apr. 20, 1909.
3 SHEETS—SHEET 1.
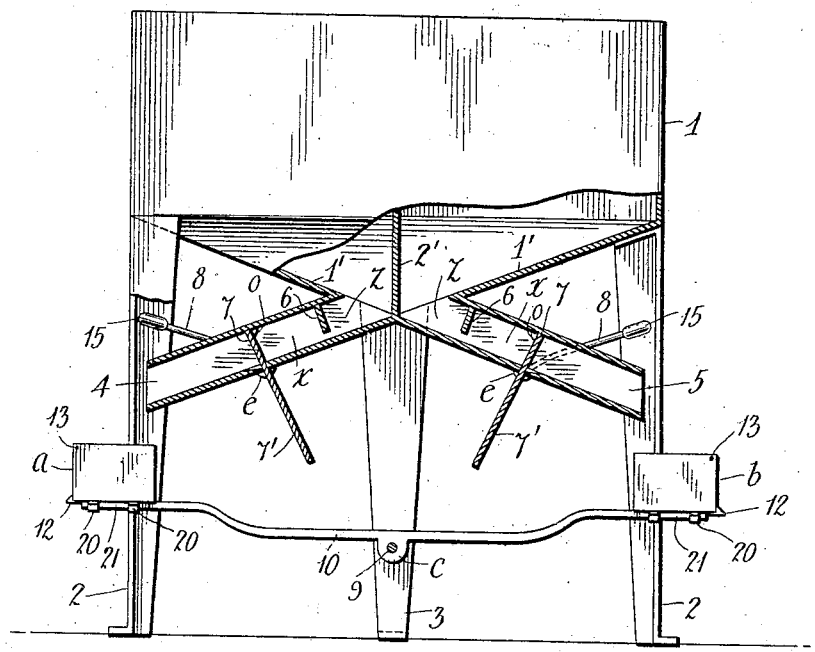
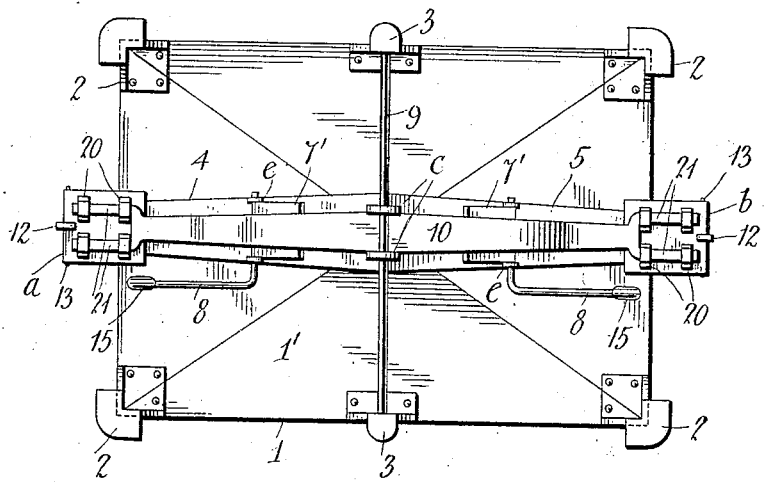
Witnesses
Inventor
Joseph S. Duke
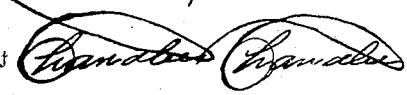
Attorneys

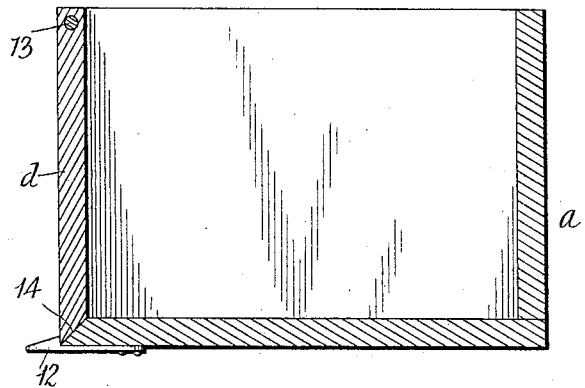
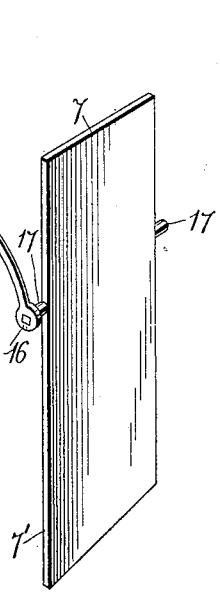
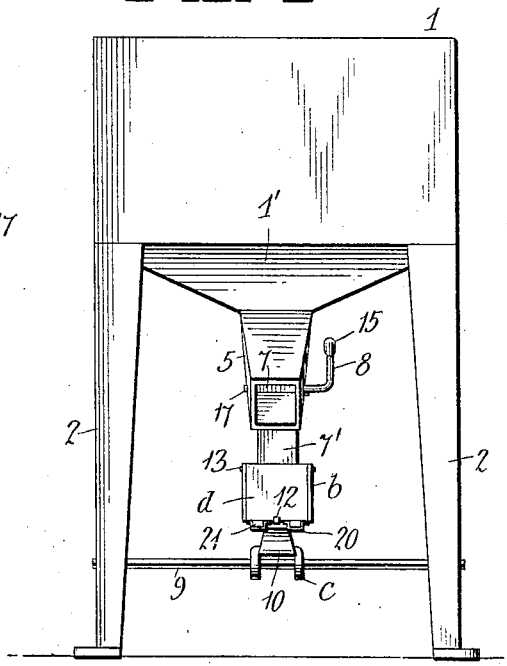

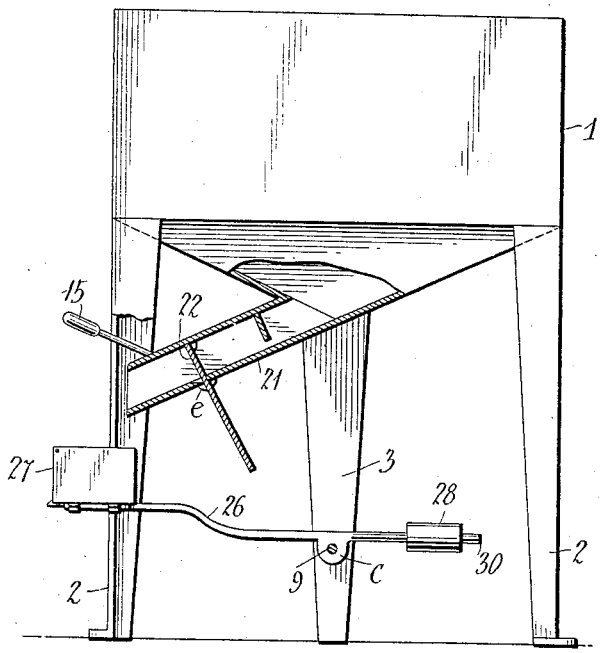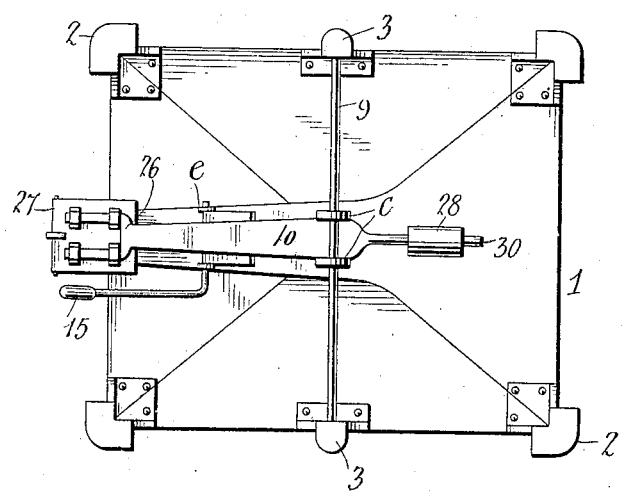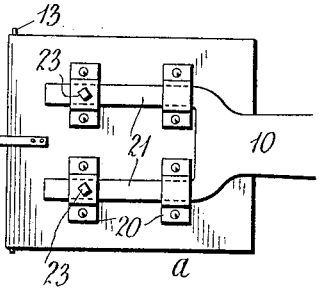

UNITED STATES PATENT OFFICE.

JOSEPH S. DUKE, OF HICO, TEXAS.

BIN-MEASURING APPARATUS.

No. 919,139.  Specification of Letters Patent.  Patented April 20, 1909.

Application filed December 19, 1907. Serial No. 407,253.

*To all whom it may concern:*

Be it known that I, JOSEPH S. DUKE, a citizen of the United States, residing at Hico, in the county of Hamilton, State of Texas, have invented certain new and useful Improvements in Bin-Measuring Apparatus; and I do hereby declare the following to be a full, clear, and exact description of the invention, such as will enable others skilled in the art to which it appertains to make and use the same.

This invention relates to a new and useful bin measuring and weighing device.

The object of my invention is to provide a measure and weighing device secured to a suitable bin or magazine from which the commodity or merchandise may be drawn or emptied in predetermined quantities and my invention embodies certain other novel features as will be described more fully hereinafter.

In the accompanying drawings, I have shown in Figure 1 a side elevation partly in section of a bin provided with my measuring device. Fig. 2 discloses a bottom view thereof. Fig. 3 shows an enlarged sectional view of one of the measures as used in my invention. Fig. 4 discloses a perspective view of one of the valves. Fig. 5 shows an end view of my bin measure. Fig. 6 shows a modification thereof. Fig. 7 shows a bottom view of the modification, and Fig. 8 is an enlarged detail disclosing the method of securing the interchangeable measures.

In many places where a certain commodity or merchandise is sold in stated and given measures or quantities, it is highly desirable to have a device so that the commodity may be speedily and accurately measured out. In the retail sale of potatoes for instance in grocery stores, the retail sale of coal in small quantities and in the sale of grains and other like commodities in given measures such as a peck or bushel measure, for instance, it is highly desirable to have a measure which can be quickly and expeditiously operated to weigh out and measure the commodity in the desired quantity.

In accomplishing the object of my invention, I use a suitable bin 1 as shown in Fig. 1 which has an inclined bottom as is shown at 1', a partition 2' dividing this bin into two compartments. This bin is supported by means of the end legs 2, 2 and the intermediate supports or legs 3. From the bottom of this bin, I project in opposite directions from the inclined bottoms 1' thereof, the two similar chutes 4 and 5. Within each chute, there is pivotally mounted a suitable valve 7 which is projected in the portion 7' to form a counter balance so that these valves will be held at a suitable angle within their respective chutes. In Fig. 4 I disclose an enlarged perspective view of one of these valve blades showing connected thereto the operating lever 8 terminating in a handle 15, this lever being provided with the bearing stems 17 held within suitable ears $e$ secured to the under surface of the chutes 4 and 5 to properly hold these valves. Below each chute as shown in Fig. 1 is held an interchangeable measure as shown at $a$ and $b$ carried by the scale beam 10, this scale beam 10 rocking upon the member 9 held between the intermediate supports 3 as disclosed. These measures are of a predetermined capacity and hold a peck, half bushel, or bushel or any other desired quantity. The front of each measure is in the form of a pivotally held panel $d$ as shown in Fig. 3 secured upon a suitable rod or pin 13 so that the front portion of each measure may be tilted outward from the bottom, and to facilitate a clean emptying of the measures and prevent any clogging of material between the door $d$ and the bottom of the measure, the meeting edges of both the bottom and valve front are beveled edged as is shown at 14 in Fig. 3. A suitable spring keeper or latch 12' is secured to the bottom of the measure to detachably secure the valve front of each measure as disclosed.

Now when it is desired to speedily measure out potatoes grain or coal in given quantities, say in peck quantities, two operators will use the machine as shown in Fig. 1 and the bins being filled with the proper commodity and the measures $a$ and $b$ being of proper capacity, the operators will grasp the handles of the levers 8 to tilt the valves 7 slightly to permit an overflow of the commodity within the same over the upper edge of the valves, the material then passing through the chute and into the respective measures held below the chutes. As soon as one operator has his measure full, he checks the supply in forcing the valve into its original closed position so that the opposite operator can also adjust his valve to fill his measure in doing which both of the measures will finally evenly balance. Suitable receptacles are then properly placed below the measures when the latches or keepers 12' are sprung to permit the valve front of the measures to open to empty the contents. The scale beam 10 will, of course, be properly tilted to fully empty both of the measures. In this way certain merchandise may be speedily and accurately measured out of the magazine or bin. Where potatoes or other crushable commodities are used, I provide the chutes with a downwardly projecting stop shield 6 which does not extend clear to the bottom but divides the chute into two compartments $x$ and $z$ to the rear of the valve 7. In measuring potatoes, for instance, the potatoes will escape in one or two layers below the shield 6 and gravitate into the compartment $x$ from which they will escape. As soon as the desired quantity is in the measure the valves can be instantly thrown back and this is not done against the weight of all the potatoes within the chute but only practically against those within the compartment $x$ which as this valve recedes crowds the potatoes upward in the forward chute compartment $x$ without bruising, crushing or otherwise mutilating them. From this it will also be seen that the weight of all the potatoes within the chute is not against the valve 7 so that this valve can be held in a nicely balanced condition which is accomplished by means of the lower counterbalancing portion 7'.

As far as described, it will be noticed that the device is duplex in operation in that two operators can simultaneously use the same. In the modification shown in Fig. 6, however, I show but one chute 21 and one valve 22 emptying into the measure 27 held upon the scale beam 26 which is provided with a counterpoise 28 held upon the scale beam 30 so that any desired quantity may be weighed within the measure 27. This measure 27 is of course also of a given capacity and when filled with a certain commodity as potatoes for instance would be made to balance evenly with the counterpoise 28.

In order that the measures of various capacities may be interchangeably secured to the scale beam 10, this scale beam at its end is forked as at 21, as is shown in Fig. 8, while the bottom of the measure is provided with suitable ears 20, the forward ears being provided with set screws 23 to secure the measures to the forked end of the scale beam.

The device is simple of construction and positive of operation and

Having thus described my said invention what I claim as new and desire to secure by U. S. Letters Patent is—

1. In a measuring apparatus of the class described, the combination with a bin, of two chutes extending therefrom in opposite directions, a pendent shield within each chute, a valve pivotally mounted within each chute having its lower portion projecting downward to form a counterbalance, an operating arm extending from each valve, a scale beam, and a measure secured to each end of said scale beam, there being one measure below each chute.

2. In a measuring apparatus of the class described, the combination with a bin, of two chutes extending therefrom in opposite directions, a valve pivotally mounted within each chute having its lower portion projecting downward to form a counterbalance, an operating arm extending from each valve, a scale beam, a measure secured to each end of said scale beam, there being one measure below each chute, and a latch-held valve within each measure, all arranged for the purpose set forth.

3. In a measuring apparatus of the class described, the combination with a bin, of a chute extending from said bin in a downwardly direction, a valve pivotally held within said chute having its lower portion projecting downward to form a counterbalance, an operating arm extending from said valve, a pivotally held scale beam, a measure secured to one end of said scale beam, said measure being below said chute, and a latch held valve within said measure, all arranged as set forth.

In testimony whereof, I affix my signature, in presence of two witnesses.

JOSEPH S. DUKE.

Witnesses:
TULLUS A. RANDALS, Jr.,
H. S. BYRD.